(12) United States Patent
Broadhead et al.

(10) Patent No.: US 10,017,975 B2
(45) Date of Patent: Jul. 10, 2018

(54) VEHICLE DOOR CONTROL SYSTEM WITH DYNAMIC OBSTACLE DETECTION

(71) Applicant: Warren Industries Ltd., Concord (CA)

(72) Inventors: Douglas Broadhead, Brampton (CA); Thomas P. Frommer, Mount Albert (CA)

(73) Assignee: WARREN INDUSTRIES LTD., Concord (CA)

( * ) Notice: Subject to any disclaimer, the term of this patent is extended or adjusted under 35 U.S.C. 154(b) by 0 days.

(21) Appl. No.: 15/115,149

(22) PCT Filed: Jan. 27, 2015

(86) PCT No.: PCT/CA2015/000041
§ 371 (c)(1),
(2) Date: Jul. 28, 2016

(87) PCT Pub. No.: WO2015/113137
PCT Pub. Date: Aug. 6, 2015

(65) Prior Publication Data
US 2016/0348413 A1 Dec. 1, 2016

Related U.S. Application Data

(60) Provisional application No. 61/933,602, filed on Jan. 30, 2014.

(51) Int. Cl.
*E05F 5/00* (2017.01)
*E05F 15/40* (2015.01)
(Continued)

(52) U.S. Cl.
CPC ............... *E05F 5/00* (2013.01); *B60R 21/34* (2013.01); *E05F 15/40* (2015.01); *E05F 15/70* (2015.01);
(Continued)

(58) Field of Classification Search
CPC . E05F 15/43; E05F 15/42; E05F 15/00; E05F 15/40; E05F 15/70; E05F 2015/483;
(Continued)

(56) References Cited

U.S. PATENT DOCUMENTS 3,743,047 A 7/1973 Marchisano
4,458,446 A 7/1984 Mochida et al.
(Continued)

FOREIGN PATENT DOCUMENTS

EP 0580147 A1 1/1994
JP 09060386 A 3/1997
(Continued)

OTHER PUBLICATIONS

PCT/CA2014/000109, International Search Report, dated Feb. 14, 2014.
(Continued)

*Primary Examiner* — Justin B Rephann
(74) *Attorney, Agent, or Firm* — Millman IP Inc.

(57) ABSTRACT

In an aspect, a vehicle door control system is provided for a vehicle having a vehicle body and a vehicle door. The door control system includes a check arm mounted to one of the vehicle body and the vehicle door, a check arm holder at least a portion of which is mounted to the other of the vehicle body and the vehicle door, and a controller. The controller is programmed to apply a resistive force on the vehicle door based on a determination of whether an obstacle is approaching the vehicle, data relating to the obstacle, and a position of the vehicle door.

19 Claims, 11 Drawing Sheets

(51) Int. Cl.
*E05F 15/73* (2015.01)
*E05F 15/70* (2015.01)
*B60R 21/34* (2011.01)
*E05F 15/72* (2015.01)
*E05F 15/42* (2015.01)

(52) U.S. Cl.
CPC .............. *E05F 15/72* (2015.01); *E05F 15/73* (2015.01); *E05F 2015/483* (2015.01); *E05Y 2201/21* (2013.01); *E05Y 2201/408* (2013.01); *E05Y 2400/302* (2013.01); *E05Y 2400/44* (2013.01); *E05Y 2400/45* (2013.01); *E05Y 2400/532* (2013.01); *E05Y 2400/54* (2013.01); *E05Y 2800/252* (2013.01); *E05Y 2900/531* (2013.01)

(58) Field of Classification Search
CPC .......... E05F 2015/434; E05F 2015/433; E05F 2015/435; E05F 2015/436
See application file for complete search history.

(56) References Cited

U.S. PATENT DOCUMENTS

| | | |
|---|---|---|
| 4,674,230 A | 6/1987 | Takeo |
| 5,173,991 A | 12/1992 | Schoeffler |
| 5,468,042 A * | 11/1995 | Heinrichs ............. E05C 17/305 16/51 |
| 6,225,768 B1 | 5/2001 | Cookson et al. |
| 6,314,612 B1 * | 11/2001 | Rennecke .......... E05D 11/1028 16/51 |
| 6,744,365 B2 | 6/2004 | Sicuranza |
| 6,842,943 B2 | 1/2005 | Jackson |
| 6,901,630 B2 | 6/2005 | Williams |
| 6,962,023 B2 | 11/2005 | Daniels et al. |
| 7,151,350 B2 | 12/2006 | Haag et al. |
| 7,175,227 B2 | 2/2007 | Menard |
| 7,280,035 B2 | 10/2007 | McLain et al. |
| 7,500,711 B1 | 3/2009 | Ewing et al. |
| 7,530,141 B2 | 5/2009 | Mah |
| 7,552,953 B2 | 6/2009 | Estremsky |
| 7,586,402 B2 | 9/2009 | Bihler et al. |
| 7,686,378 B2 | 3/2010 | Gisler et al. |
| 7,761,209 B2 | 6/2010 | Morris et al. |
| 7,845,053 B2 | 12/2010 | Marsh et al. |
| 7,977,903 B2 | 7/2011 | Kamiya |
| 8,020,683 B2 | 9/2011 | Borys et al. |
| 8,077,024 B2 | 12/2011 | Laufer et al. |
| 8,280,593 B2 | 10/2012 | Nakakura et al. |
| 8,600,606 B2 * | 12/2013 | Nickolaou ........ B60W 30/0953 342/70 |
| 2001/0042820 A1 | 11/2001 | Wilson |
| 2004/0200149 A1 | 10/2004 | Dickmann et al. |
| 2005/0085972 A1 | 4/2005 | Martinez |
| 2007/0156317 A1 * | 7/2007 | Breed .................... B60N 2/002 701/45 |
| 2007/0266635 A1 | 11/2007 | Sugiura et al. |
| 2008/0294314 A1 | 11/2008 | Morris et al. |
| 2008/0296927 A1 * | 12/2008 | Gisler ..................... E05F 15/43 296/146.4 |
| 2008/0307711 A1 * | 12/2008 | Kern ..................... E05C 17/305 49/501 |
| 2009/0000196 A1 | 1/2009 | Kollar et al. |
| 2009/0033477 A1 * | 2/2009 | Illium ................. B60R 21/0134 340/436 |
| 2009/0051192 A1 * | 2/2009 | Ewing .................. E05F 15/622 296/146.2 |
| 2009/0260289 A1 * | 10/2009 | Carpenter ................ E05F 5/00 49/26 |
| 2010/0024301 A1 | 2/2010 | Wuerstlein et al. |
| 2010/0076651 A1 | 3/2010 | Nakakura et al. |
| 2010/0082206 A1 | 4/2010 | Kollar et al. |
| 2010/0145617 A1 * | 6/2010 | Okada ....................... B60R 1/12 701/300 |
| 2010/0228448 A1 * | 9/2010 | Nakakura ............... E05F 15/43 701/49 |
| 2011/0295469 A1 | 12/2011 | Rafii et al. |
| 2013/0074412 A1 | 3/2013 | Wellborn et al. |
| 2016/0208537 A1 * | 7/2016 | Senguttuvan ..... B60W 50/0098 |

FOREIGN PATENT DOCUMENTS

| | | |
|---|---|---|
| JP | 2000168519 A | 6/2000 |
| JP | 2005226297 A | 8/2005 |
| JP | 2010236196 A | 10/2010 |
| KR | 102003067779 A | 8/2003 |
| KR | 102005045396 A | 5/2005 |
| KR | 1020070056266 A | 6/2007 |
| KR | 2010044537 B1 | 4/2010 |
| KR | 20110048941 A | 5/2011 |
| WO | 2004001170 A1 | 12/2003 |
| WO | 2006072315 A1 | 7/2006 |
| WO | 2006072319 A1 | 7/2006 |
| WO | 2012061936 A1 | 5/2012 |
| WO | 2012161404 A1 | 11/2012 |

OTHER PUBLICATIONS

PCT/CA2015/000041, International Search Report, dated Apr. 29, 2015.

* cited by examiner

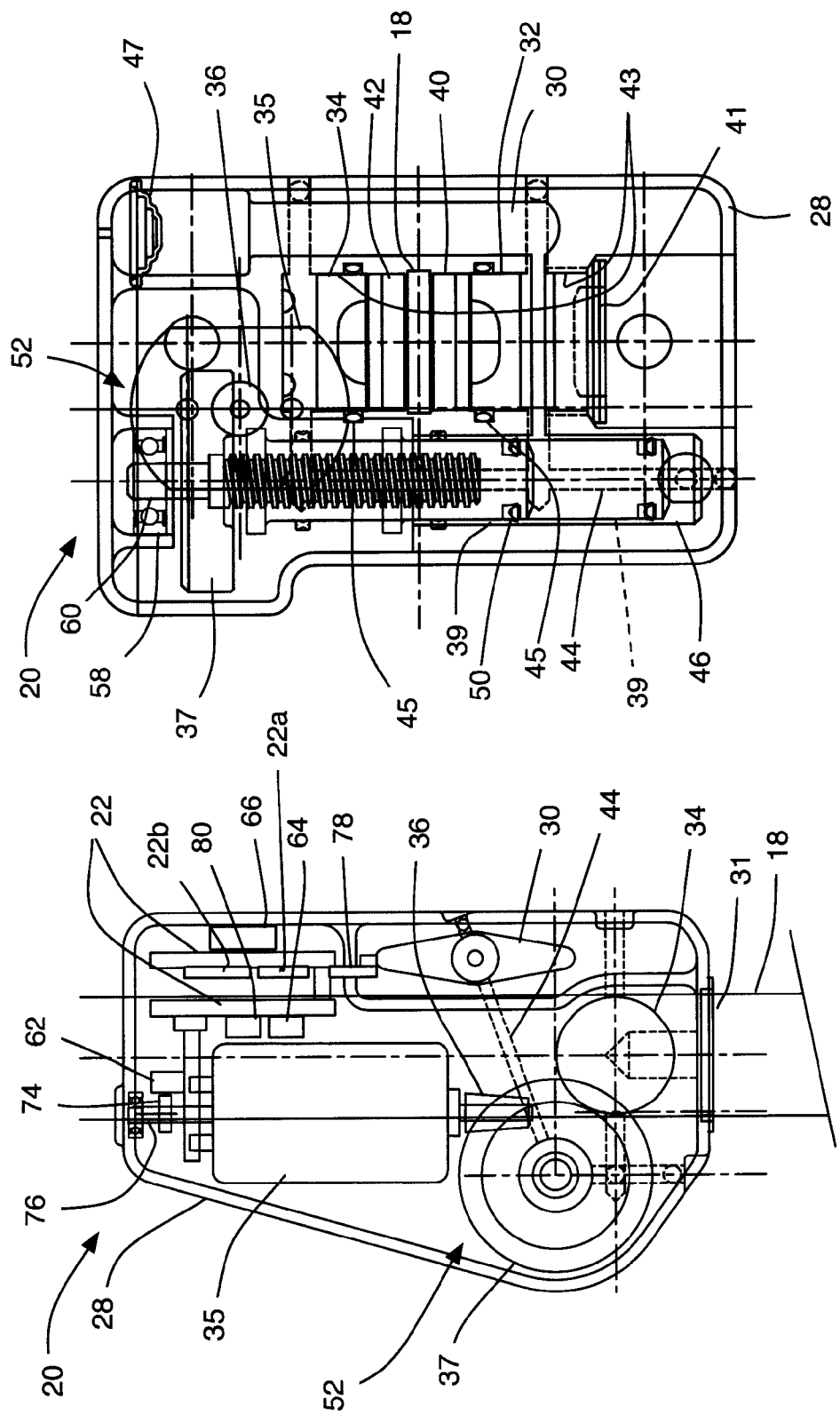

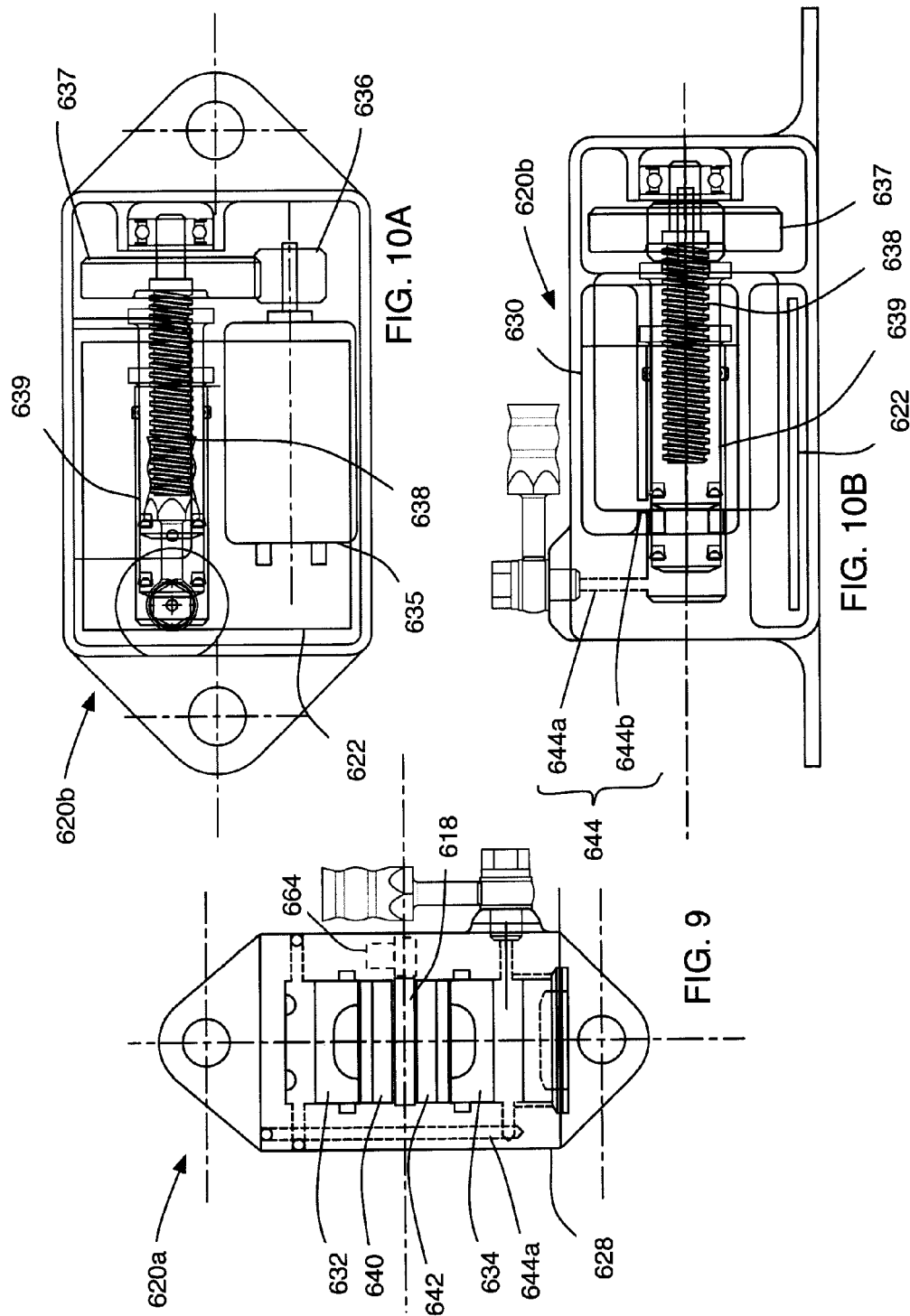

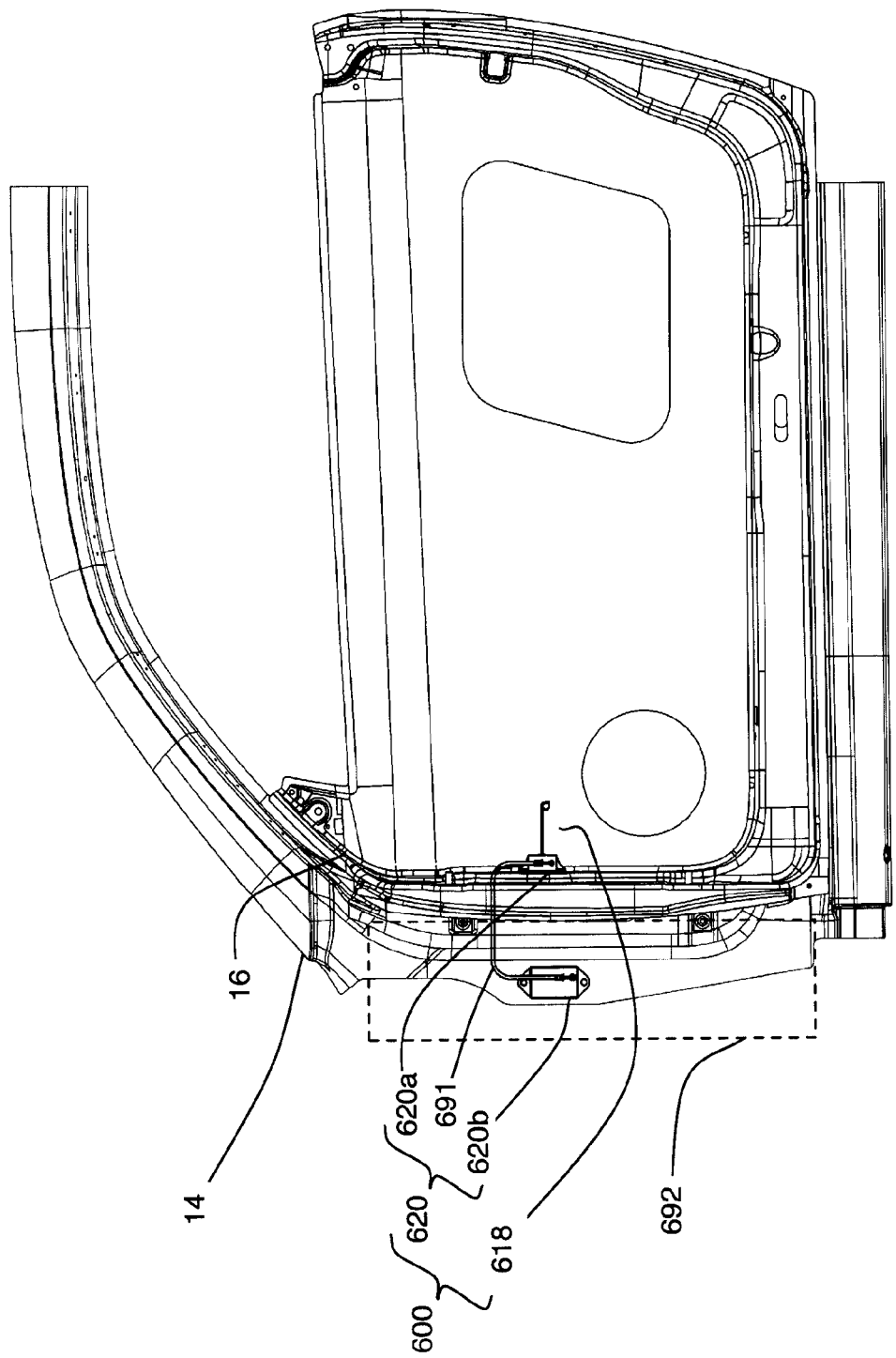

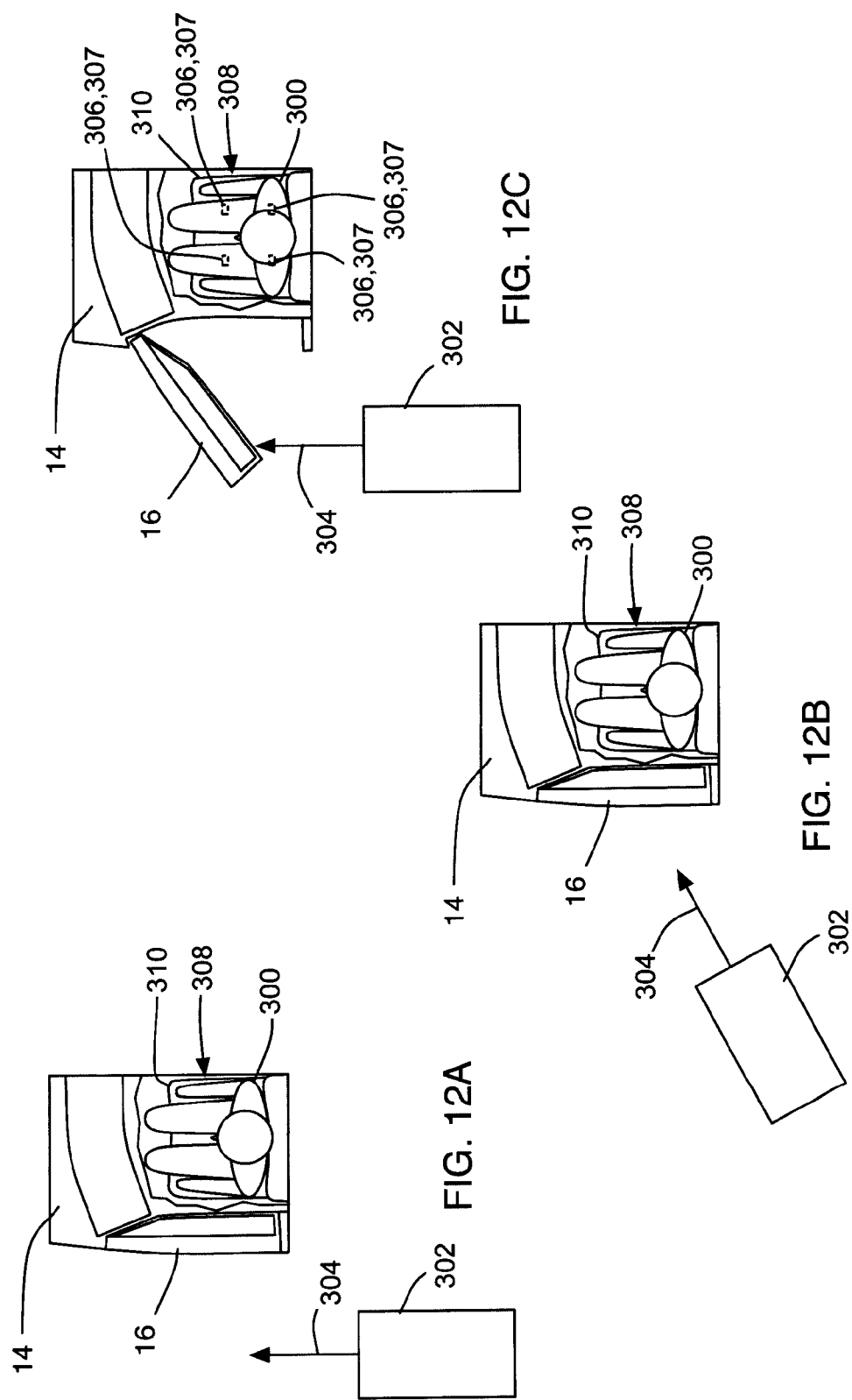

US 10,017,975 B2

VEHICLE DOOR CONTROL SYSTEM WITH DYNAMIC OBSTACLE DETECTION

FIELD

This disclosure relates generally to vehicle door check systems and more particularly to active door check systems that permit the door to be checked at a plurality of positions.

BACKGROUND

Vehicle doors are typically swung between fully closed and fully opened positions to permit ingress and egress of passengers to and from a vehicle. A door check system is typically employed to provide one or more intermediate positions for the door for convenience. Traditional door check systems are passive in that there is no active control of the door to hold it in any position.

A problem can arise when a vehicle occupant wishes to open the door and there is an obstacle that is approaching the vehicle. If the occupant does not see the obstacle, the door can wind up being opened into the path of the obstacle. In situations where, for example, the obstacle is a cyclist, this can lead to injury, and damage to the door itself.

It would be beneficial to provide a door check system that is capable of detecting obstacles and of reacting to such detection in a suitable way.

SUMMARY

In an aspect, a vehicle door control system is provided for a vehicle having a vehicle body and a vehicle door. The door control system includes a check arm mounted to one of the vehicle body and the vehicle door, a check arm holder at least a portion of which is mounted to the other of the vehicle body and the vehicle door, and a controller. The controller is programmed to apply a resistive force on the vehicle door based on a determination of whether an obstacle is approaching the vehicle and based on data relating to the obstacle. In some embodiments, the controller is also programmed to apply the resistive force based on a determination of a position of the vehicle door.

Other inventive aspects of the present disclosure will become readily apparent based on the teachings contained herein.

BRIEF DESCRIPTION OF THE DRAWINGS

The foregoing and other aspects will now be described by way of example only with reference to the attached drawings, in which:

FIG. 6 is a plan view of the door control system shown in FIG. 3 with a portion of the housing cut away;

FIG. 7 is a sectional front view of the door control system shown in FIG. 3;

FIG. 9 is an end view of a first subassembly that is part of the door control system shown in FIG. 8;

FIGS. 10A and 10B are plan and side views of a second subassembly that is part of the door control system shown in FIG. 8;

FIG. 11 is an alternative arrangement of the first and second subassemblies to that which is shown in FIG. 8;

FIGS. 12A-12C are illustrations of three scenarios in which an obstacle approaches the vehicle.

DETAILED DESCRIPTION

Figure 1:
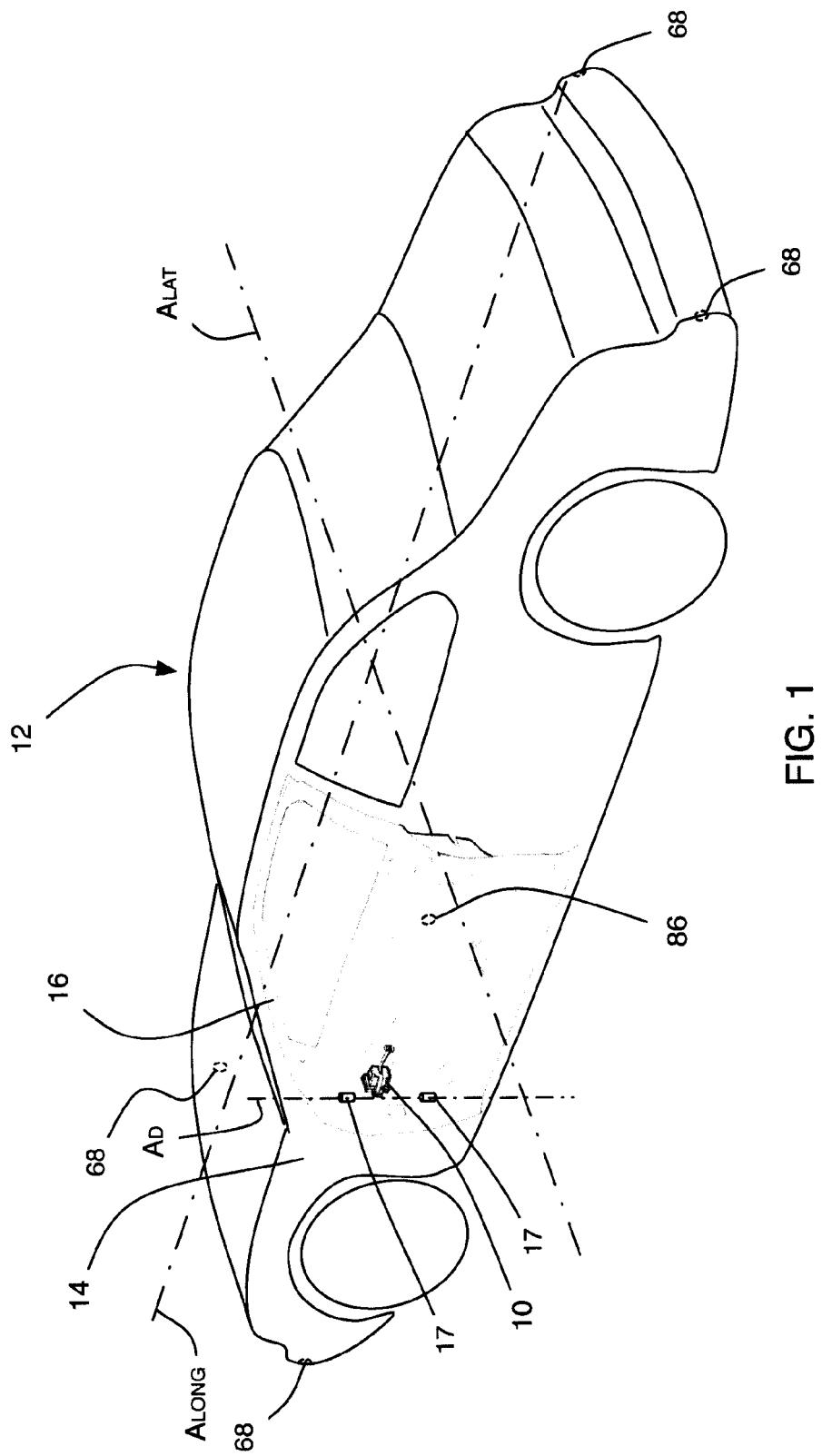
FIG. 1 is a perspective view of a vehicle that includes a door and a door control system in accordance with an embodiment of the present invention.

Reference is made to FIG. 1, which shows a vehicle door control system 10 for a vehicle 12 having a vehicle body 14 and a vehicle door 16 pivotally mounted to the body 14 by way of hinges 17 for pivoting movement about a door pivot axis $A_D$, in accordance with an embodiment of the present disclosure. The vehicle 12 may be any suitable type of vehicle, such as a motor vehicle (such as an automobile or a truck). In the example shown, the vehicle 12 is an automobile.

Figure 1A:
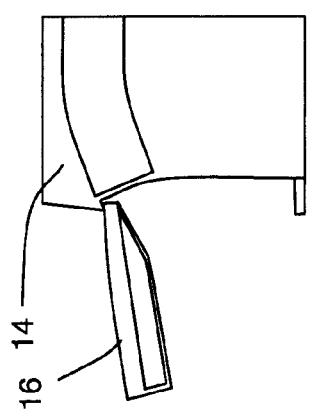
FIGS. 1a and 1b show the door in the fully opened and fully closed positions respectively.
Figure 1B:
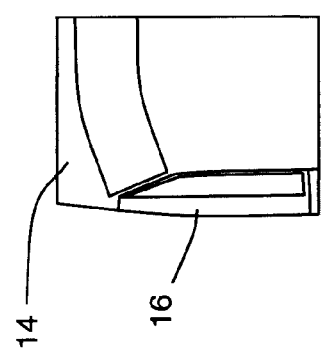
Figure 3:
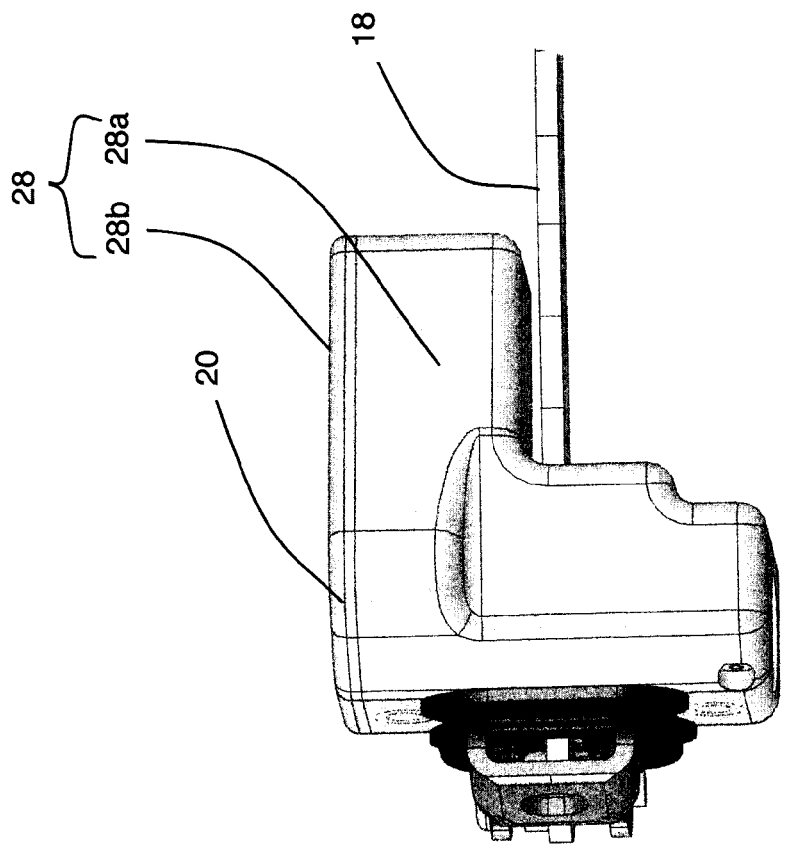
FIG. 3 is a magnified perspective view of the door control system shown in FIG. 1, including a check arm and a check arm holder.

The vehicle door control system 10 is an active system and is capable of checking the door 16 in a plurality of positions throughout a range of movement that extends between a fully open position (FIG. 1A) and a fully closed position (FIG. 1B). It is active in the sense that there is some control over whether or not it applies a resistive force on the door 16. In some embodiments, the door control system 10 has infinite door check capability in that it can check the door 16 at any position within some or all of the aforementioned range of movement. In other embodiments, the door control system 10 can check the door 16 in any of a plurality of discrete positions within the aforementioned range of movement.

In some embodiments, the door control system 10 may only permit the user to check the door 16 in a certain portion of the range of movement. For example, in some instances this may be to inhibit the door 16 from being checked when it is very near to its fully closed position (as described further below).

The door control system 10 is capable of detecting obstacles that are approaching the vehicle 12, and is configured to adjust its operation in certain circumstances. In some cases, this adjustment in operation can reduce the severity of a collision with the obstacle. In some cases it can avoid a collision that would otherwise have occurred. Depending on the situation and the particular embodiment provided, the door control 10 can reduce the severity of injuries to a cyclist or pedestrian in the event of an impact with the vehicle 12; it can reduce or avoid damage to the vehicle 12; and it can protect the vehicle occupant from injury.

Mechanical Construction

A brief description of the mechanical construction of the door control system follows.

Figure 2:
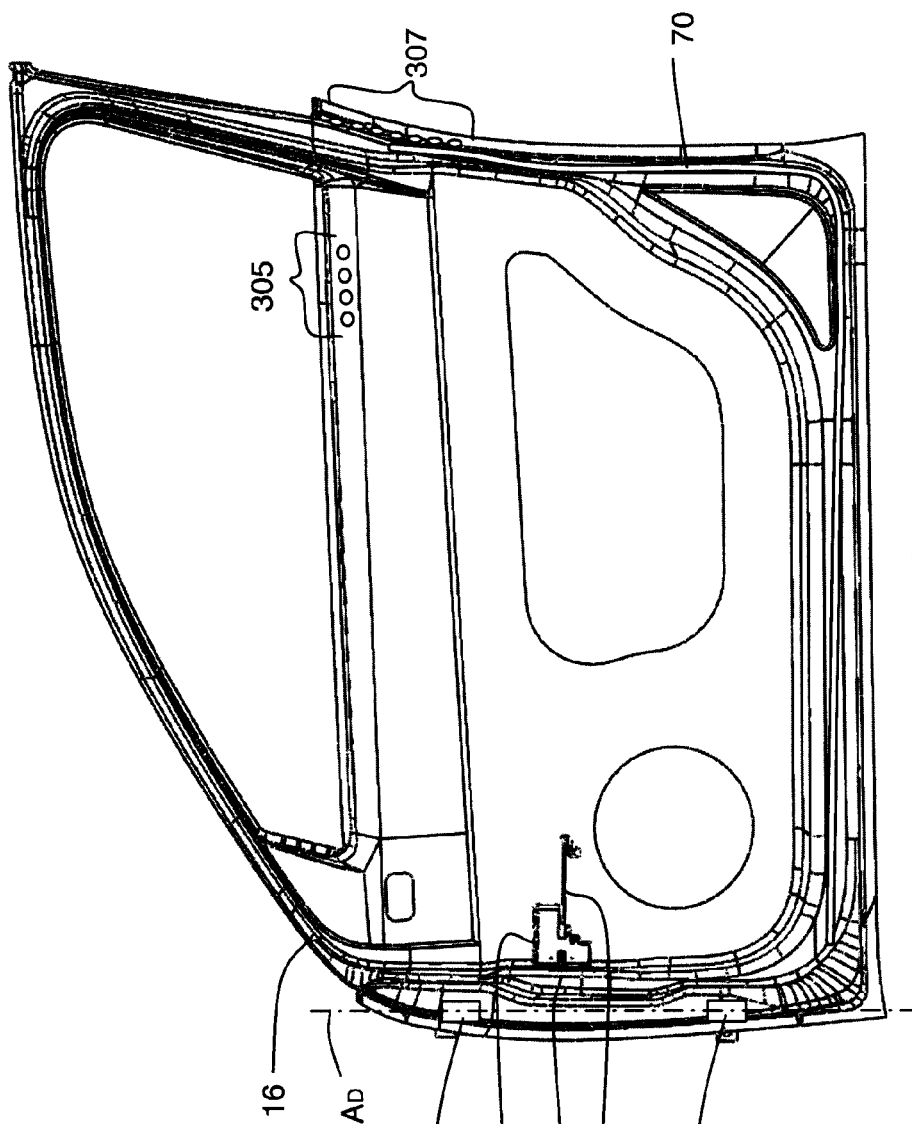
FIG. 2 is a side view of the door shown in FIG. 1.

Referring to FIG. 2, the door control system 10 includes a check arm 18, a check arm holder 20 and a controller 22.

The check arm 18 may be mounted to one of the vehicle body 14 and the vehicle door 16, and the check arm holder 20 may be mounted to the other of the vehicle body 14 and the vehicle door 16. In the embodiment shown in FIG. 5, the check arm 18 is mounted to the vehicle body 14 and the check arm holder 20 is mounted to the vehicle door 16. More particularly, the check arm 18 is pivotally mounted to a door sill (shown at 23 in FIG. 5) on the vehicle body 14 via a pin connection shown at 24, while the check arm holder 20 is fixedly mounted to the inside surface of the forward edge face (shown at 26) of the door 16.

The check arm holder 20 is shown in more detail in FIGS. 3-7. The check arm holder 20 includes a housing 28 (shown in FIGS. 3, 4A and 5-7 but omitted from FIG. 4B). Referring to FIGS. 4B-7, the check arm holder further 20 includes a fluid reservoir 30, first and second brake members 32 and 34 (which in this instance may be pistons), a motor 35, a spiral bevel pinion 36, a spiral bevel ring gear 37, a lead screw 38 and a master piston 39. Any other suitable gear arrangement is alternatively possible such as for example a worm and worm wheel combination, or two spur gears. Additionally, while two gears are shown in the gear arrangement, it is alternatively possible to provide a gear arrangement containing three or more gears.

The housing 28 may be formed from two housing members 28a and 28b that mate together to enclose the other components. The housing 28 contains a pass-through aperture 29 for the check arm 18. A seal 31 may be provided at each end of the aperture 29 so as to prevent dirt and debris that may build up on the check arm 18 from getting into the check arm holder 20 during sliding movement of the check arm 18 through the holder 20. Additionally, a guide member 27 may be provided at each end of the aperture 29 so as to guide the movement of the check arm 18 along a selected path through the housing 28.

A limit member 33 (FIGS. 4B and 5) may be provided on the free end of the check arm 18 so as to engage the housing 28 when the door 16 when the door is opened to a selected angle, so as to provide a mechanical limit for the maximum open position of the door 16.

The first and second brake pistons 32 and 34 are movable by way of fluid pressure, between a check position in which the pistons 32 and 34 apply a holding force (also referred to as a check force) to the check arm 18 and a retracted position wherein the pistons 32 and 34 are retracted from the check position. In the retracted position, the brake pistons 32 and 34 may be spaced from the check arm 18 so as not to apply any braking force to the check arm 18. Alternatively, in the retracted position, the pistons 32 and 34 may continue to apply a braking force on the check arm 18 but a smaller braking force than in the check position. The overall movement between the advanced and retracted positions may be relatively small, and in some cases less than 1 mm.

As shown in FIG. 7, a plug 41 plugs a bore 43 that is provided in the housing 28 and that holds the brake pistons 32 and 34. Brake piston seals 45 are provided to seal between the bore 43 and the pistons 32 and 34 to prevent leakage of fluid out of the housing 28 past the pistons 32 and 34. The seals 45 may be O-rings provided in the housing 28 as shown, or alternatively on the pistons 32 and 34. Any other suitable seals may alternatively be provided.

While two movable brake members 32 and 34 are shown in FIGS. 4B-7, in an alternative embodiment a single moveable brake member could be used to advance and retract on one side of the check arm 18, so as to clamp the check arm 18 against a stationary brake member on the other side of the check arm 18. Embodiments incorporating a single moving brake member are described further below with reference to FIGS. 12-14 and FIGS. 16-17.

Returning to FIGS. 4B-7, first and second brake pads 40 and 42 may be provided on the first and second pistons 32 and 34 to provide a selected friction coefficient with the sides 18a and 18b of the check arm 18.

A fluid passage system 44 connects the fluid reservoir 30 to the first and second brake pistons 32 and 34. The fluid itself may be an incompressible fluid such as hydraulic oil, or a compressible fluid such as a gas. In the embodiment shown the fluid is hydraulic oil. A bellows 47 (FIG. 7) is provided at an end of the fluid reservoir 30 to accommodate thermal expansion of the fluid in the fluid passage system 44.

In an embodiment, the master piston 39 is positioned in a master piston chamber 46 that is fluidically between the reservoir 30 and the first and second brake pistons 32 and 34, and that divides the fluid passage system 44 into a first portion 44a which is connected to the brake pistons 32 and 34 and a second portion 44b which is connected to the reservoir 30. The master piston 39 is movable between a retracted position wherein the master piston chamber 46 fluidically connects the first and second portions 44a and 44b and generates a low fluid pressure state in the fluid passage system 44, and an advanced position wherein the piston 39 disconnects the first portion 44a from the second portion 44b and generates a high fluid pressure state in the first portion 44a.

Movement of the master piston 39 to the advanced position brings the brake pistons 32 and 34 to their advanced positions. In embodiments wherein the fluid in the fluid passage system 44 is brought to a sufficiently low pressure when the master piston 39 is moved to the retracted position, such movement may force the pistons 32 and 34 to a retracted position wherein the pistons 32 and 34 are spaced from the check arm 18 so as not to apply any braking force to the check arm 18. Such an embodiment may be used wherein it is desired at some point to be able to move the door 16 with substantially no resistance. For example, in embodiments wherein the door 16 is relatively heavy, it may be desirable to provide no further resistance to movement of the door 16 beyond the resistance provided by the inertia of the door 16 itself.

The master piston 39 may be movable to a plurality of intermediate positions between the retracted and advanced positions so as to permit adjustment of the pressure applied by the brake pistons 32 and 34 to the check arm 18. In an embodiment, the master piston 39 may be infinitely adjustable in position between its retracted and advanced positions thereby permitting infinite control over the pressure applied by the brake pistons 32 and 34.

In an alternative embodiment, movement of the master piston 39 to the retracted position results in a lower pressure than in the advanced position, but results still in a positive pressure such that the brake pistons 32 and 34 remain in engagement with the check arm 32 and continue to apply a braking force to the check arm 18, albeit a lower braking force than when the piston 39 is in the advanced position. Such an embodiment can be used, for example, in situations where it is desirable to always provide some resistance to movement to the door.

Figure 4A:
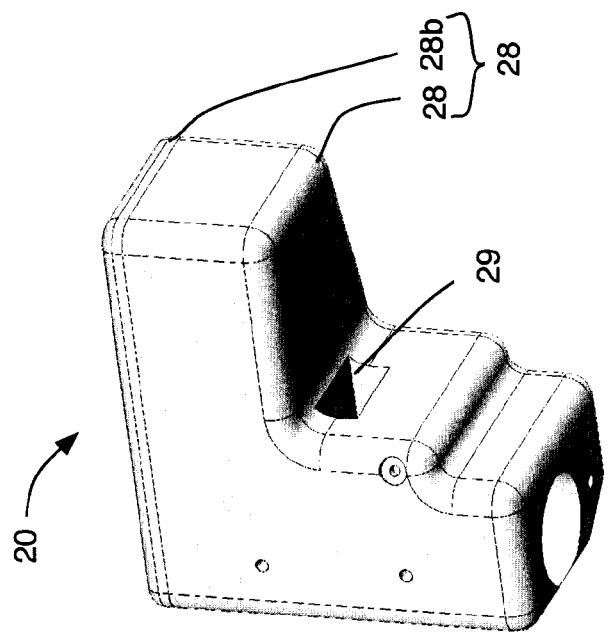
FIG. 4A is a perspective view of the check arm holder shown in FIG. 3.
Figure 4B:
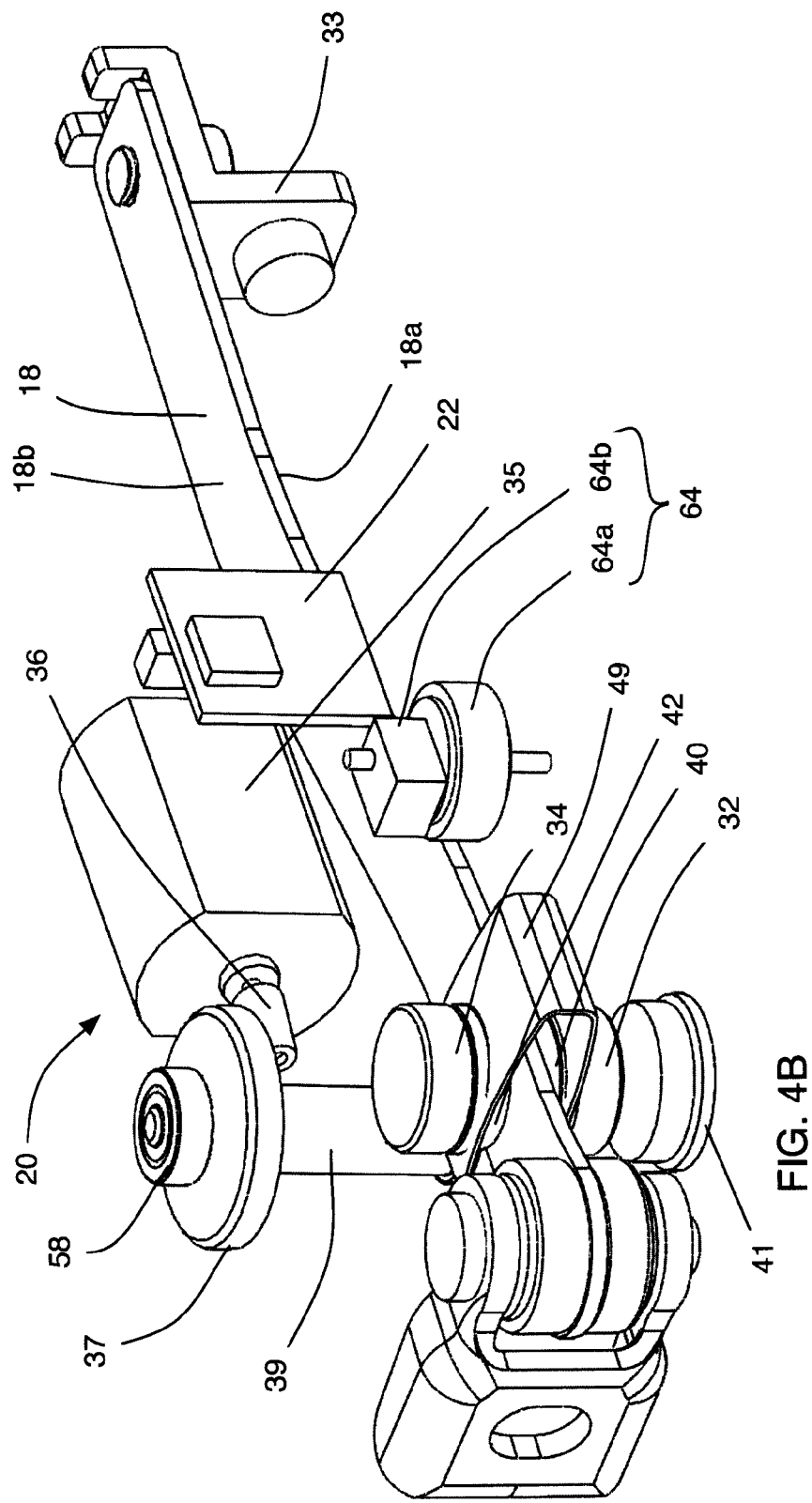
FIG. 4B is a perspective view of the internal components of the check arm holder and the check arm shown in FIG. 3, showing an example structure for determining the position of the door.

As shown in FIG. 4B, an optional piston biasing member 49 may be provided to urge the brake pistons 32 and 34 towards their retracted positions, wherein they are spaced from the check arm 18 so that they apply no braking force on the check arm 18 in the retracted position. The biasing member 49 can be configured based on the pressure in the fluid passage system 44 when the master piston 39 is in the retracted position to ensure that the pistons 32 and 34 move away from the check arm 18. The biasing member 49 may be any suitable type of biasing member, such as, for example, a generally V-shaped leaf spring. In the embodiment shown, the V-shaped biasing member 49 is engaged with shoulders on each of the brake pads 40 and 42 to assist in retracting the brake pads 40 and 42 when the pistons 32 and 34 are retracted. The brake pads 40 and 42 may alternatively or additionally be joined to pistons 32 and 34 by some other means such as by an adhesive. The piston biasing member 49 is not shown in the other figures.

Figure 5:
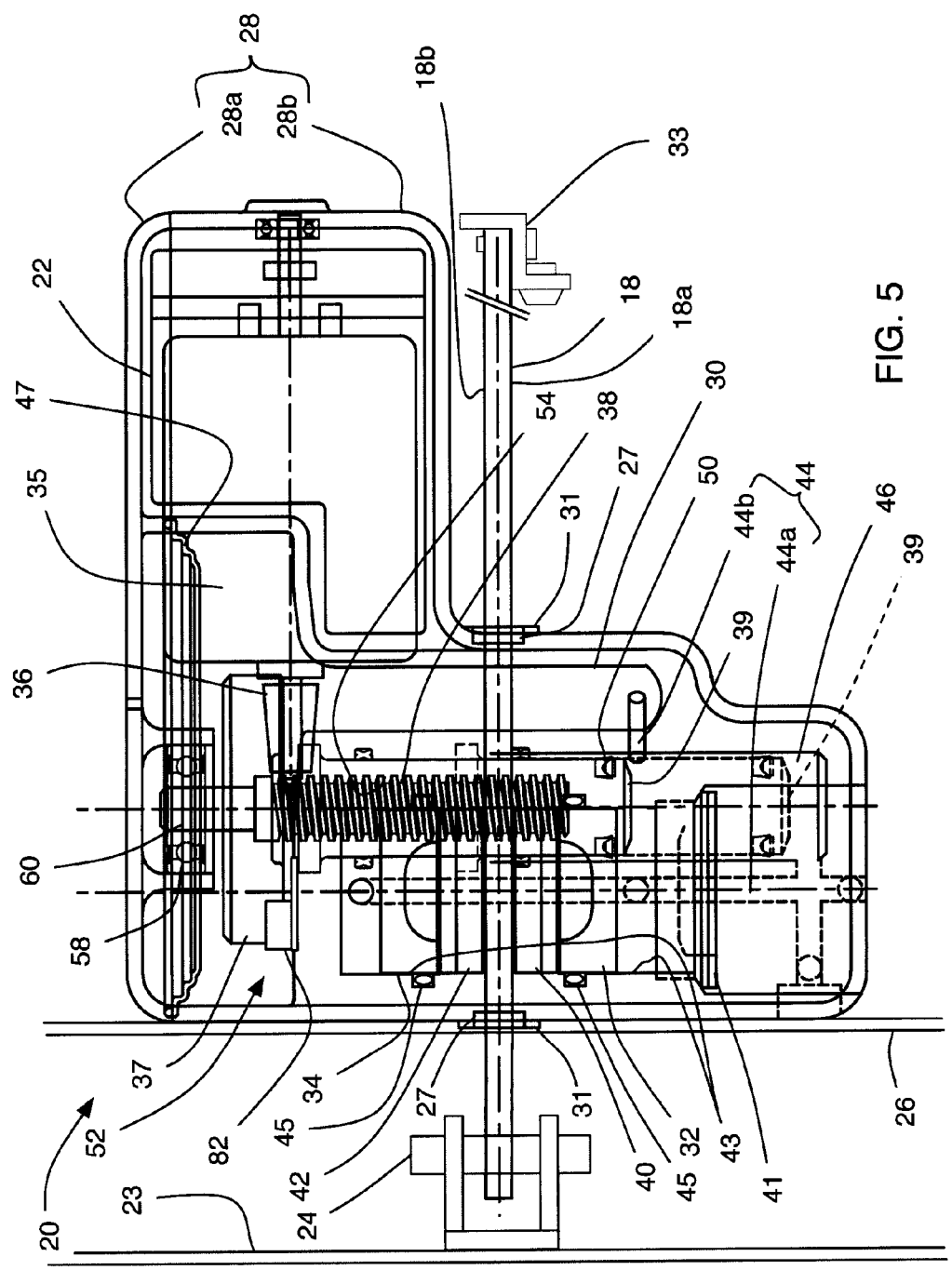
FIG. 5 is a sectional side view of the door control system shown in FIG. 3.

Referring to FIGS. 5 and 7, a suitable seal, such as an O-ring seal shown at 50 may be provided on the master piston 39 so as to form a seal with the master piston chamber 46, so as to resist leakage of fluid therepast from the first portion 44a of the fluid passage system 44 during advancement of the piston 39.

The movement of the master piston 39 may be provided by a master piston actuator 52 formed by the motor 35, the pinion 36, the ring gear 37 and the lead screw 38. More particularly, the motor 35 drives rotation of the pinion 36 by receiving electric current from a power source via the controller 22. The rotation of the pinion 36 drives rotation of the ring gear 37, which is directly connected to the lead screw 38. The master piston 39 has an internal thread 54 that is engaged by the lead screw 38, and is slidable in the chamber 46 but not rotatable in the chamber 46. Prevention of rotation of the master piston 39 may be achieved by any suitable means, such as by a flat (i.e. planar) surface on the master piston 39 that engages a flat (i.e. planar) mating surface on the housing 28. Another suitable means may be, for example, a set of ball bearings that move along parallel axially directed tracks between the piston 39 and the piston chamber 46.

Rotation of the lead screw 38 in a first direction (caused by rotation of the ring gear 37 in the first direction) advances the master piston 39, and rotation of the lead screw 38 in a second direction (caused by rotation of the ring gear 37 in the second direction) retracts the master piston 39. A thrust bearing 58 is mounted in the housing 28 to support the free end (shown at 60) of the shaft that holds the ring gear 37 and the lead screw 38. The thrust bearing supports the ring gear 37 and lead screw 38 against axial loads imparted while driving the master piston towards its advanced and retracted positions.

The controller 22 controls the operation of the check arm holder 20 (and more specifically operation of the motor 35), based on signals from a plurality of sensors. The sensors may include, for example, a motor speed sensor 62 to determine the speed of the motor 35, a door position sensor 64, a door accelerometer 66 (FIG. 6) or other similar device such as a gyroscope, a door opening obstacle sensor 68 (FIG. 1) and a door closing obstacle sensor 70 (FIG. 2). It will be noted that in some embodiments, some of these aforementioned sensors is optional. For example, in some embodiments, a door accelerometer 66 (FIG. 6) may be omitted and instead door acceleration data and door velocity data may be determined by the controller 22 based on input from the door position sensor 64.

With reference to FIG. 6, the motor speed sensor 62 may, for example, be a Hall-effect sensor that senses a magnet 74 on a ring that is on a rear portion of the output shaft (shown at 76) of the motor 35.

The door position sensor 64 may include, for example, a wheel 64a (FIG. 4B) that is caused to rotate by the passage of the check arm 18 through the check arm holder 20, and a rotary encoder 64b that detects the rotation of the wheel 64a.

Referring to FIG. 6, the door accelerometer 66 may be a 3-axis accelerometer. Door speed may be derived by the controller 22 from the change in door position over time using data from position sensor 64, or alternatively, it may be derived from the acceleration data from accelerometer 66. The accelerometer may also be used as a vehicle orientation sensor.

Additional sensors may be provided such as a pressure sensor 78 to determine the fluid pressure in the fluid passage system 44, a current sensor 80 (FIG. 6) for determining the current being drawn by the motor 35 and a limit switch 82 (FIG. 5) to determine when the master piston 39 is fully retracted.

Figure 8:
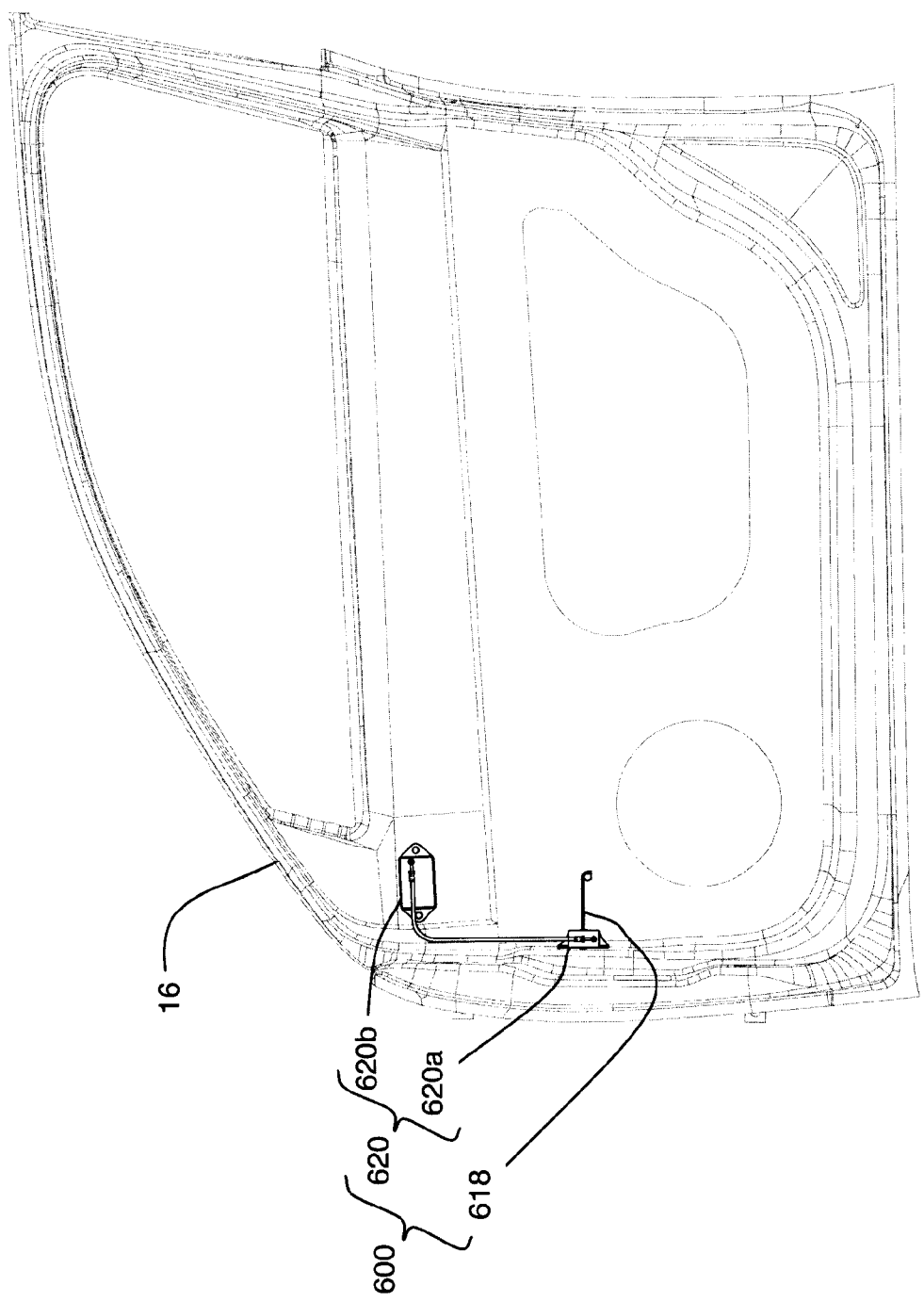
FIG. 8 is a side view of a door that includes an alternative embodiment of a door control system.

Reference is made to FIG. 8, which shows another embodiment of a door control system 600. The door control system 600 shown in FIG. 8 is operated by application of fluid pressure and may thus be similar to the door control system 10 shown in FIGS. 3-7, however the door control system 600 includes a check arm 618, and a check arm holder 620 that includes two separate subassemblies (shown at 620a and 620b) which are separate from each other. The first subassembly 620a, shown more clearly in FIG. 9, may include a first subassembly housing 628a, brake members 632 and 634 which have brake pads 640 and 642 thereon, and which may be similar to brake members 32 and 34, and a door position sensor 64. The second subassembly 620b, shown more clearly in FIGS. 10A and 10B, may include a master piston 639 (shown in both retracted and advanced positions), a motor 635, first and second gears 636 and 637 which may be a spur gears or any other suitable types of gear, a lead screw 638, and a controller 622. All of these components may be similar to their counterpart components (which have similar reference numbers) in the embodiment shown in FIGS. 3-7. A fluid conduit shown at 691 may be used to fluidically connect the first subassemblies 620a and 620b. An electrical conduit extends along the fluid conduit 691 and may be used to electrically connect the sensor 664 with the controller 622 so as to permit the carrying of sensor signals back to the controller 662.

By dividing the system 600 into multiple subassemblies, it is possible to position only selected components in the door 16 near the check arm 618, while positioning the other components remotely so as to minimize intrusion into the region of the door 16 in which the window regulator (not shown) would be placed. The second subassembly 620b may be placed in the door 16 up near the position of the mirror (not shown), as shown in FIG. 8.

Alternatively, as shown in FIG. 11, the second subassembly 620b may be placed anywhere else that is suitable and may even be positioned inside the body 14 of the vehicle 12, in particular in a 'dry' zone of the vehicle 12, shown schematically at 692, that is considered to be safe from exposure to moisture. This can reduce the cost for the motor and other electrical components since they do not need to be protected from moisture in the manner that they would if they were mounted in an area of the vehicle where moisture can reach them, such as in the door 16. In such an embodiment, the fluid conduit 691 passes between the body 14 and the door 16. A suitable seal may be provided for where the conduit 691 passes into the body 14 so as to prevent moisture from entering the dry zone 692. A seal is also provided where the fluid conduit 691 enters the door 16 so as to inhibit entry of moisture into the door 16. The conduit 691 may be flexible so as to ensure that it does not inhibit movement of the door 16.

The arrangement shown in FIG. 11 is advantageous in that no additional power needs to be sent to the door 16 from the vehicle's electrical system in order to power the check arm holder 620 since the motor 635 and the controller 622 are positioned in the vehicle body 14.

The fluid passage system shown at 644 for the check arm holder 620 may be similar to the fluid passage system 44 shown in FIG. 5, and is divided into first and second portions 644a and 644b in similar manner to fluid passage system 44, however, the first portion 644a includes the fluid conduit 691 which connects between a first port 693a on the first subassembly 620a and a second port 693b on the second subassembly 620b.

While the check arm holder 620 is shown to include two sub assemblies 620a and 620b, it will be understood that it could include more than two subassemblies.

In some of the embodiments described herein, the use of brake pistons is described. It will be understood that these are merely examples of brake members that are movable relative to the housing in which they are situated. It will further be understood that, while in some embodiments a single brake member is moved relative to the housing and in other embodiments two brake members are movable relative to the housing, any of these embodiments may be configured to be operated with one or more brake members that are movable relative to the housing.

While a detailed description of the components used to cause movement of one or more of the first and second brake members have been described in each of the embodiments described herein, the components may collectively be referred to as a brake member actuator.

In embodiments wherein a motor is described and a plurality of components are driven by the motor so as to transfer power ultimately to one or both of the brake members those components may collectively be referred to as a drive train.

Sensors directly involved in obstacle detection include a plurality of door opening obstacle sensor 68 (FIG. 1) which may be, for example, ultrasonic sensors similar to the type of sensor used for collision warning on the rear bumpers of some vehicles, with a difference being that the door opening obstacle sensors 68 may be configured to sense obstacles that are farther away from the vehicle 12 than those that are typically used for collision warning during parking maneuvers. The sensors 68 may be positioned to scan forwardly, rearwardly and laterally. To this end, there may be a sensor 68 at each corner of the vehicle 12, having a field of view that extends both laterally and longitudinally. In this way, the front and rear sensors 68 on the driver's side of the vehicle 12 can sense obstacles coming from the front and rear of the vehicle 12, and they can cooperate with their combined fields of view to sense obstacles approaching the vehicle 12 from a lateral direction. In some embodiments it may be possible to have as few as one sensor 68, which may, for example, only be capable of sensing obstacles in one region (e.g. obstacles that approach the vehicle 12 from the rear and on the driver's side). The data provided by the one or more sensors 68 is used by the controller 22 to determine one or more of (and preferably all of) the distance of the obstacle from the door 16, the direction of movement of the obstacle relative to the vehicle 12, and the speed of the obstacle relative to the vehicle 12.

The data provided by the sensors 68 may be sufficient to permit the controller 22 to characterize the type of obstacle that is approaching into one of a plurality of categories, such as, for example, whether the obstacle is a motor vehicle or is not a motor vehicle. In a more sophisticated version, the controller 22 may be able to determine whether the obstacle is a cyclist, a pedestrian or a motor vehicle. For this purpose, if the sensors 68 are ultrasonic sensors, they may be capable of providing sufficient data to the controller 22 for the controller 22 to at least characterize the obstacle sufficiently to place it in one of the aforementioned three categories. If the obstacle is determined to have a certain aspect ratio the controller 22 may determine that it is not a motor vehicle and is either a pedestrian or a cyclist. If the obstacle is determined to be wider than a selected value, then the controller 22 may determine that it is a motor vehicle. The controller 22 may use the speed of the obstacle to assist in distinguishing whether it is a cyclist or a pedestrian. For example, a relatively high speed is an indication that it is more likely to be a cyclist than a pedestrian.

Alternatively, one or more cameras may be provided for sending image or other data to the controller 22 so that the controller 22 can determine the type of obstacle. In such an instance, the camera data may be used to determine the type of obstacle, and ultrasonic sensor data may be used to determine position, speed and direction of the obstacle. The response from the controller 22 in terms of controlling the operation of the check arm holder 20 may differ, depending on what type of obstacle it determines is approaching.

In addition, a door closing obstacle sensor 70 (FIG. 2) may be, for example, in the form of a capacitive strip that is on the seals of the door 16, as is known to be in use on closure panels of certain vehicles.

The controller 22 includes a processor 22a and memory 22b, and further includes a plurality of inputs and outputs for receiving signals from the sensors and/or from the vehicle's data bus. The controller's memory 22b contains code that may be in any suitable form.

Controller Operation

The programming of the controller 22 is described below, in relation to its handling of certain scenarios. For example, in a first scenario, the vehicle door 16 is closed, and a vehicle occupant wants to open the door 16. At the same time, an obstacle approaches the vehicle 12, and the controller 22 determines that, based on the position, speed and direction of the obstacle, the obstacle will pass through some portion of the range of movement of the door 16, but that a collision can be avoided as long as the door 16 does not open past a certain position. This scenario is depicted in FIG. 12A, where the vehicle occupant is shown at 300 and the obstacle is shown at 302. Only a portion of the vehicle 12 is shown, and the roof of the vehicle 12 is shown partially cut away to show the occupant 300 inside.

In this first scenario, the controller 22 may cause the check arm holder 20 (FIG. 5) to apply a selected force on the check arm 18 so as to generate an increased amount of resistance (also referred to as resistive force) to opening the door 16 than would normally exist. Optionally, it may be possible to increase the resistive force sufficiently to substantially prevent the occupant 300 from opening the door 16, however, this may be undesirable in the event that the controller 22 malfunctions and traps the occupant 300 in the vehicle 12 because it determines that an obstacle 302 is approaching the vehicle 12 when there is, in fact, no obstacle. It is, therefore, preferred to increase the resistance of the door 16 (even to significantly increase the resistance), but to keep the resistance at a level that permits the occupant 300 to overcome it and open the door 16. The increased resistance of the door 16 can be used as an indication to the occupant 300 to stop opening the door 16 any further. Additionally, the controller 22 may indicate to the occupant 300 that an obstacle 302 is approaching by way of some suitable output, such as an audible chime, a visual indication (e.g. one or more LEDs shown at 305 on the inside face of the door 16) or through tactile means, such as by pulsing the braking action of the check arm holder 20. By varying the strength and/or frequency of the pulsations, or the number, colour or brightness of the one or more LEDs 305, or the strength, pitch or frequency of the audible chime, the controller 22 may be programmed to indicate the proximity of the obstacle 302 or the general immediacy of the need to stop movement of the door 16 to avoid a collision.

Additionally, the controller 22 may be programmed to provide an indication to the obstacle 302 of the potential collision, so that the obstacle 302 may also take action to avoid it, particularly where the obstacle 302 is a cyclist or pedestrian. For example, the opening of the door 16 and the subsequent stoppage of the door 16 may be sufficient indication to the obstacle 302 of the potential collision. Additionally, an audible or visual indication may be provided, such as by a chime emitted outside the vehicle 12 or by one or more LEDs 307 (FIG. 2) on an edge of the door 16.

In some embodiments the door control system 10 may be programmed to avoid checking the door 16 (or applying any increased resistive force to movement of the door 16) within a certain proximity to the fully closed position, which may be referred to as a dead zone. The dead zone is a zone that extends from the closed position outward by a selected amount (e.g. about 10 degrees). The provision of a dead zone is, in part, because such a small amount of opening would not be useful for many purposes and so it is not considered a range in which the user is likely to want to keep the door 16 checked. Additionally, preventing the door 16 from being checked in this zone is advantageous in that it prevents the door 16 from being in a position wherein the user has to accelerate the door 16 sufficiently to overcome the door seal force and fully latch the door 16, from a checked position that is only a few degrees away from the fully closed position.

In a situation where the controller 22 characterizes the approaching obstacle 302 as being another motor vehicle, the controller 22 may override the dead zone and may increase the resistive force applied to the door 16 so as to be sufficient to substantially prevent an occupant from opening the door. Optionally the controller 22 may apply a maximum resistive force available for the vehicle door 16, so as to stop the door 16 outright even within the dead zone, if the controller 22 determines that the position, speed and direction of the approaching vehicle warrant it, so as to protect the vehicle occupant 300 from potential harm. The direction of the obstacle 300 is shown at 304. In other words, in some embodiments the door position sensor 64 is provided in communication with the controller and is positioned to detect whether the vehicle door is open by less than a selected amount so as to establish the dead zone. In some embodiments, during situations in which there is no obstacle detected, the controller 22 is programmed to prevent checking of the vehicle door 16, and during situations in which the controller 22 detects an obstacle and determines that the obstacle 302 is another motor vehicle, the controller 22 is programmed to apply the resistive force on the vehicle door 16 even if the vehicle door 16 is open by less than the selected amount.

In a second scenario (with reference to FIG. 12B), the vehicle door 16 is closed and the occupant 300 wants to open the door, while an obstacle 302 approaches the vehicle 12. In this example, the controller 22 determines based on the obstacle 302 data (the collective term referring to the position, the speed and the direction 304 of movement of the obstacle 302 and optionally the type of obstacle), that a collision is imminent, unless some action is taken by the obstacle 302 to avoid it. In such a scenario the controller 22 may permit the door 16 to be opened by a small amount and may then increase the resistance of the door 16 by some amount in an attempt to stop the door 16, while still permitting the occupant 300 to overcome the increased resistance and open it further if desired. This movement and stoppage of the door 16 may alert the obstacle 302 as to the presence of the vehicle 12 which may cause the obstacle 302 to take action to avoid a collision. Additionally, by permitting the door 16 to open by some amount, there is some amount of travel available to the door 16 towards the closed position. This can be useful in situations where the collision with the obstacle 302 would drive the door 16 in the closing direction. In such a case, the controller 22 may use this travel to control the deceleration of the obstacle 302 upon collision with the door 16 so as to absorb the energy of the impact. For example, the controller 22 may determine that the door position is 15 degrees from the closed position, and may apply a resistive force to the door 16 that permits the door to move the entire 15 degrees before the door 16 and the obstacle 302 come to a stop. In other words, the controller 22 may permit movement of the door 16 in a controlled way so as to maximize the amount of travel that the obstacle 302 undergoes before coming to a stop, so as to reduce as much as possible the forces acting on the obstacle 302. The controller 22 may use an estimate of the weight of the obstacle 302 and the speed of the obstacle 302 in order to determine the resistive force to apply to the door 16 that will use up all of the available travel of the door 16. The weight of the obstacle 302 may be a value obtained from memory 22b and may be based on a determination of the type of obstacle that the controller 22 determines the obstacle 302 to be. For example, the controller 22 may estimate the weight of the obstacle 302 to be 150 lbs., if the obstacle 302 is determined to be a pedestrian, and may estimate the weight of the obstacle 302 to be 180 lbs. if the obstacle 302 is determined to be a cyclist.

Where the obstacle 302 is a pedestrian or a cyclist, this action can reduce the severity of any injury incurred by them from the collision. It can also reduce the amount of damage caused to the vehicle door 16 by the collision. In situations where the collision would drive the door 16 towards the open position, the controller 22 may again determine the amount of travel available between the current position of the door 16 and the relevant end point of its range of travel (which in this case is the fully open position instead of the closed position), and may apply a resistive force to the door 16 to maximize the door's travel (and therefore the obstacle's travel) before coming to a stop.

Thus, in general, the controller 22 may be said to programmed to determine an estimate of the weight and speed of the obstacle 302 and an available travel for the vehicle door 16 based on the position of the vehicle door 16, and is programmed to determine the resistive force to apply to the vehicle door 16 based on the estimated weight and speed of the obstacle so as to bring the obstacle 302 to a stop using substantially all of the available travel of the vehicle door 16 (i.e. to dissipate substantially all of the kinetic energy of the obstacle 302 using substantially all of the available travel of the vehicle door 16).

A third scenario, illustrated in FIG. 12C, is when the obstacle 302 approaches while the door 16 is already open and the occupant 300 may wish to close the door 16, and the controller 22 has determined that an obstacle 302 will collide with the door 16 unless the occupant 300 moves the door 16 out of the way or the obstacle 302 takes action to avoid the collision. In the illustration in FIG. 12C the door 16 is shown as being partially open, however the scenario also covers a situation where the door 16 is fully open. In this scenario, the controller 22 may permit the occupant 300 to move the door 16 and then may stop the door at some intermediate position (by increasing the resistance to movement of the door 16), while still permitting the occupant 300 to overcome the resistance and move the door 16 further if desired). This movement and stoppage may, as noted above, alert the obstacle 302 as to the potential collision so as to permit the obstacle 302 to attempt to take evasive action. Additionally, audible or visual output (e.g. a chime outside the vehicle 12 and/or LEDs 307 on the edge of the door 16 may be used to indicate the potential collision to the obstacle 302.

Visual, audible and/or haptic feedback may also be provided to the vehicle occupant 300 to warm them of the potential collision. Haptic feedback (e.g. pulsations of the braking action) may only be perceivable by the occupant 300 if they are in contact with the door (e.g. if they are attempting to close the door 16), and so in this instance it may be desirable to at least provide one or both of the visual and audible feedback in addition to or instead of the haptic feedback.

If the collision will drive the door 16 in the opening direction (e.g. if the obstacle 302 is approaching the vehicle 12 from the rear), and if the controller 22 determines that the obstacle is a 'cyclist' or is a 'pedestrian', then the controller 22 may permit the door 16 to be moved towards the fully open position (if it is not there already) while applying a resistive force on the door 16 that increases the amount of travel the door 16 and obstacle 302 undergo before coming to a stop (relative to a situation if the door 16 were simply held locked in a position), so as to decelerate the obstacle 302 as slowly as possible, and absorb as much of the energy of the collision as possible.

If the collision will drive the door 16 in the closing direction (e.g. if the obstacle 302 is approaching the vehicle 12 from the front), and if the controller 22 determines that the obstacle is of the type 'cyclist' or 'pedestrian', the controller 22 may determine how much travel is available for the door 16 in the closing direction. This amount of travel that is available depends in part on the current position of the door 16, but also depends on whether or not the occupant 300 is sitting fully inside the vehicle 12. To this end, the vehicle 12 may include one or more occupant position detection sensors 306 which communicate with the controller 22 to permit the controller 22 to determine the occupant's position. For example, the occupant position detection sensors 306 may be a plurality of pressure sensors 307 in the occupant 300's seat (shown at 308) which are spaced apart in the seat bottom shown at 310 of the seat 308, and the controller 22 may use the data from the sensors 306 to determine whether the occupant 300 is fully in the vehicle 12 or whether the occupant 300 has a body part (e.g. one or both legs, or a part of their torso) outside of the door opening. With this information, the controller 22 may determine a minimum acceptable door open angle, and may, using the minimum acceptable door open angle, determine a safe amount of available travel for the door 16 in the closing direction, wherein the minimum acceptable door open angle is selected so as to inhibit contact of the door 16 with the vehicle occupant 300. Once this safe amount of travel has been determined, the controller 22 can determine the amount of resistive force to apply to the door 16 in order to decelerate the door 16 and the obstacle 302 as slowly as possible. In addition to, or instead of pressure sensors 307, the vehicle 12 may be equipped with an interior camera (not shown) that can act as an occupant position detection sensor and can transmit image data to the controller 22 relating to the occupant 300 so that the controller 22 can determine the position of the occupant 300 based on the image data in order to determine a safe amount of travel for the door 16 in the closing direction.

If the controller 22 determines that the obstacle 302 is of the type 'vehicle', then the controller 22 may apply as high a resistive force as possible on the door 16 in an attempt to protect the vehicle occupant 300, particularly in a situation where the occupant 300 is determined to have their legs or torso outside of the vehicle 12 and where the direction of travel of the obstacle 302 will drive the door 16 in a closing direction.

Figure 13:
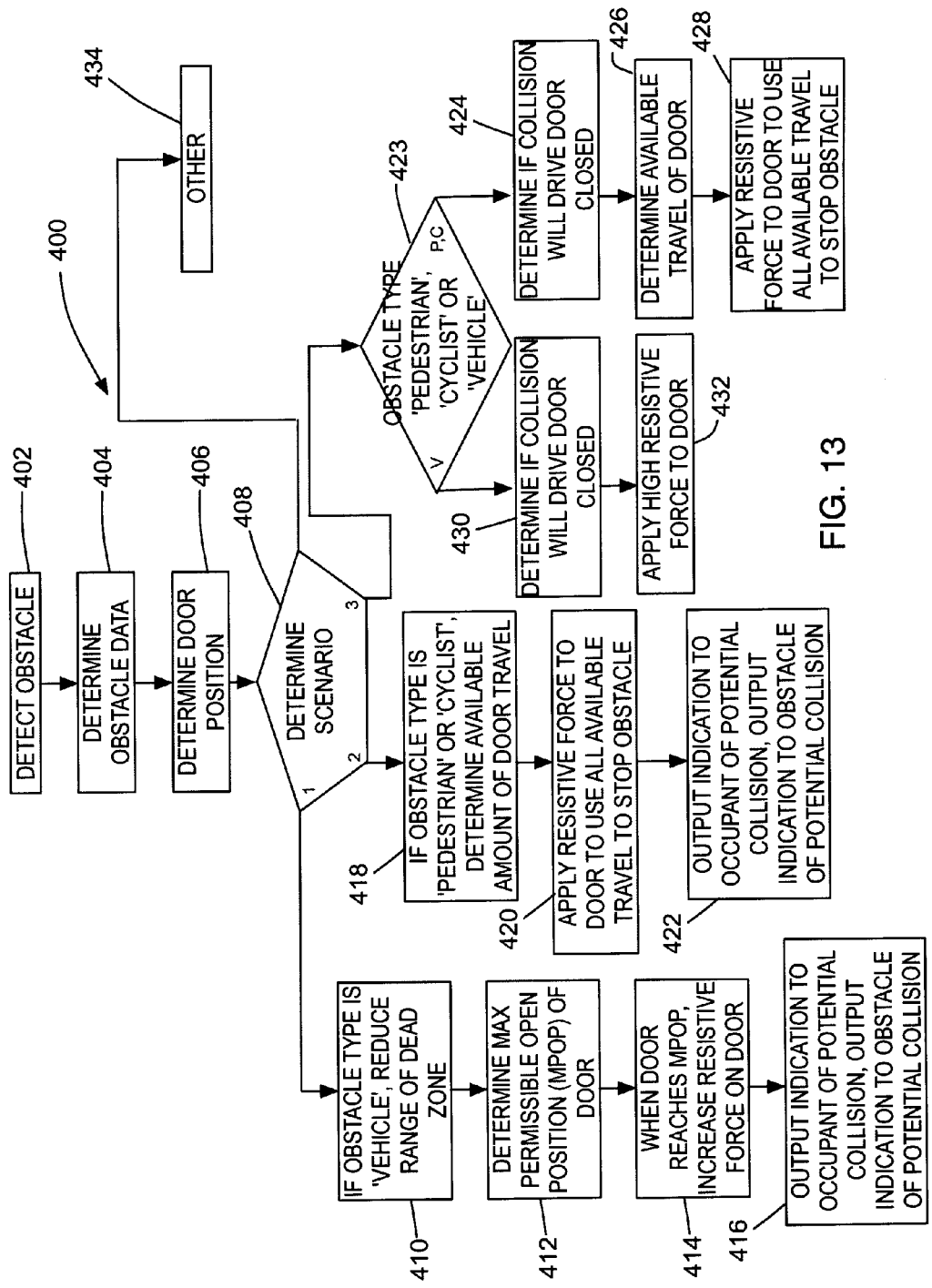
FIG. 13 is a flow diagram of a method of controlling the door check system shown in FIG. 1.

FIG. 13 illustrates a method 400 that may be carried out by the controller 22 in keeping with the description above. The method 400 begins at step 402, whereat the controller 22 detects an obstacle 302. At step 404 the controller 22 determines obstacle data, which preferably includes all of the position, speed, direction of travel and type of obstacle, but which may include a subset of these data in some situations. At step 406 the controller 22 determines the door position. It will be noted that this step need not be carried out after determining the obstacle data. For example, it may already have been carried out even before the obstacle 302 is detected. At step 408, the controller 22 determines if any of the three aforementioned scenarios exist. If the first scenario exists, the controller 22 determines whether the obstacle type is 'vehicle', in which case it reduces the size of the dead zone, at step 410. It will be noted that step 410 is optional. At step 412, the controller 22 determines the maximum permissible open position of the door 16, based at least in part on the position and direction of travel of the obstacle 302. If the door 16 is opened such that it reaches the maximum permissible open position, the controller 22 applies an increased resistive force to the door 16, at step 414. At step 416, the controller 22 outputs an indication to the occupant 300 of a potential collision with the obstacle 302, and outputs an indication to the obstacle 302 of the potential collision. In some embodiments, the controller 22 may indicate the potential collision to the occupant 300 but not to the obstacle 302. It will be noted that step 416 is optional.

If, at step 408, the controller 22 determines that the second scenario exists, then at step 418, the controller 22 may determine the amount of available door travel there is, if it determines that the obstacle type is 'pedestrian' or 'cyclist'. Step 418 may be carried out differently. For example, in step 418 the controller 22 may determine the amount of available door travel there is regardless of what type of obstacle is approaching. Thus, in some embodiments the controller 22 may be configured to not detect what kind of obstacle is approaching. At step 420, the controller 22 applies a resistive force to movement of the door 16 that is selected to use all available travel to bring the obstacle 302 to a stop, thereby reducing the amount of magnitude of the deceleration on the obstacle relative to a situation where the door 16 remained fixed in position. At step 422, the controller 22 outputs an indication to the occupant 300 of a potential collision with the obstacle 302, and outputs an indication to the obstacle 302 of the potential collision. In some embodiments, the controller 22 may indicate the potential collision to the occupant 300 but not to the obstacle 302. It will be noted that step 422 is optional.

If, at step 408, the controller 22 determines that the third scenario exists, then at step 423 the controller 22 determines which control path to follow based on whether the obstacle type is either 'cyclist', 'pedestrian' or 'vehicle'. If it is 'cyclist' or 'pedestrian', then the controller 22 executes step 424, whereat the controller 22 determines whether the collision will drive the door 16 towards the closed position based on the direction of travel of the obstacle 302. At step 426 the controller 22 determines the available travel of the door 16. If it is determined that the door 16 will be driven towards the closed position by the collision, then the determination of the available travel of the door 16 will be based on a determination of the position of the occupant 300 (e.g. a determination of whether the occupant 300 has his/her legs outside of the vehicle 12). It will be noted that the determination of the occupant's position may be made before or after the determination made at step 424. If it is determined that the door 16 will be driven towards the open position by the collision, then the determination of the available travel need not take the occupant's position into account, and may be determined based solely on the angular distance between the current position of the door 16 and its fully open position. At step 428, the controller 22 applies a resistive force to the door 16 to use all the available travel to bring the obstacle 302 to a stop.

If the obstacle type is 'vehicle' at step 423, then control proceeds to step 430, whereat the controller 22 determines whether the collision will drive the door 16 towards the closed position based on the direction of travel of the obstacle 302. If the controller 22 determines that the collision will drive the door 16 towards the closed position, then the controller 22 may apply as high a resistive force as possible to the door 16 in an attempt to prevent injury to the vehicle occupant by the door 16.

The controller 22 may be programmed to determine other scenarios also and to response accordingly. For the purposes of this disclosure, if none of the three scenarios are determined to exist, the controller 22 carries out some other action, as shown at step 434.

In the above description, the door check system 10 shown is capable of providing a variable resistive force on the door 16. While this is advantageous in some embodiments, it is possible for an embodiment of the door check system 10 to only be capable of having on/off capability in the sense that it is controllable to be in a first state (e.g. an 'on' state) wherein it applies a first, higher resistive force on the door 16, or to be in a second state (e.g. an 'off' state) wherein it applies a second, lower resistive force on the door 16. The second, lower resistive force would simply be whatever resistive force exists when the system 10 is off, and could be zero, depending on the nature of the system 10. In such an embodiment where the system 10 has only on/off capability, the system 10 could still handle the first scenario as shown in FIG. 13. For example, at step 414, when the door 16 reaches the maximum permissible open position as determined by the controller 22, the controller 22 may go from the 'off' state to the 'on' state thereby increasing the resistive force on the door 16 from zero or whatever the second, lower resistive force to the first, higher resistive force.

Based on the above, the controller 22 may be said to be programmed to:
a) determine whether an obstacle 302 is approaching the vehicle 12;
b) determine data relating to the obstacle 302;
c) determine the position of the vehicle door 16; and
d) apply a resistive force on the vehicle door 16 based on the determinations made in steps a), b) and c).

While the above description constitutes specific examples, these examples are susceptible to further modification and change without departing from the fair meaning of the accompanying claims.

The invention claimed is:

1. A vehicle door control system for a vehicle having a vehicle body and a vehicle door, comprising:
a check arm having an end that is mounted to one of the vehicle body and the vehicle door;
a check arm holder at least a portion of which is mounted to the other of the vehicle body and the vehicle door, wherein at least one of the check arm holder and the check arm is manually movable relative to the other of the check arm holder and the check arm to permit movement of the vehicle door between a closed position and a fully open position relative to the vehicle body;
a motor that is operatively connected to at least one of the check arm and the check arm holder to selectively cause a resistive force to be applied to at least one of the check arm and the check arm holder so as to inhibit movement of the vehicle door;
a controller that is programmed to:
a) determine whether an obstacle is approaching the vehicle;
b) determine data relating to the obstacle;
c) determine the position of the vehicle door;
d) apply the resistive force on the vehicle door via the motor, based on the determinations made in steps a), b) and c); and
wherein the resistive force has a magnitude that is selected based on the determinations made in steps a), b) and c).

2. A vehicle door control system as claimed in claim 1, wherein the data includes at least one of a position of the obstacle, a speed of the obstacle, a direction of the obstacle and a type of obstacle.

3. A vehicle door control system as claimed in claim 2, wherein the type of obstacle is categorized into at least two categories including at least one category including motor vehicles, and at least one category including obstacles that are not motor vehicles.

4. A vehicle door control system as claimed in claim 1, wherein the controller is programmed to:
e) determine the position of a vehicle occupant, wherein the resistive force applied in step d) is also based on the determination made in step e).

5. A vehicle door control system as claimed in claim 1, wherein, if the controller determines in step b) that the obstacle is a motor vehicle, the resistive force applied by the controller on the vehicle door is sufficient to substantially prevent an occupant from opening the door.

6. A vehicle door control system as claimed in claim 5, further comprising a door position sensor in communication with the controller and positioned to detect whether the vehicle door is open by less than a selected amount, wherein, during situations in which there is no obstacle detected, the controller is programmed to prevent checking of the vehicle door, and during situations in which the controller detects an obstacle in step a) and determines that the obstacle is a motor vehicle in step b), the controller is programmed to apply the resistive force on the vehicle door even if the vehicle door is open by less than the selected amount.

7. A vehicle door control system as claimed in claim 1, wherein the controller is programmed to determine an estimate of the weight and speed of the obstacle and an available travel for the vehicle door based on the position of the door, and is programmed to determine the resistive force to apply to the vehicle door based on the estimate of the weight and speed of the obstacle so as to bring the obstacle to a stop using substantially all of the available travel of the vehicle door.

8. A vehicle door control system as claimed in claim 1, wherein the vehicle includes at least one occupant position detection sensor that communicates with the controller and wherein, in a situation in which the controller determines that a vehicle occupant has a body part outside a door opening for the vehicle door, the controller is programmed to determine a minimum acceptable door open angle and a safe amount of available travel for the vehicle door to inhibit contact of the vehicle door with the vehicle occupant.

9. A vehicle door control system as claimed in claim 1, wherein the magnitude of the resistive force varies based on a rotational position of the motor, and wherein the vehicle door control system further comprises a position sensor that sends signals to the controller that are indicative of a rotational position of the motor,
and wherein the controller operates the motor based on the signals from the position sensor.

10. A vehicle door control system for a vehicle having a vehicle body and a vehicle door, comprising:
a check arm having an end that is mounted to one of the vehicle body and the vehicle door;
a check arm holder at least a portion of which is mounted to the other of the vehicle body and the vehicle door;
a controller that is programmed to:
a) determine whether an obstacle is approaching the vehicle;
b) determine data relating to the obstacle;
c) determine the position of the vehicle door; and
d) apply a resistive force on the vehicle door based on the determinations made in steps a), b) and c); and
a door position sensor in communication with the controller and positioned to detect whether the vehicle door is open by less than a selected amount, wherein, during situations in which there is no obstacle detected, the controller is programmed to prevent checking of the vehicle door, and during situations in which the controller detects an obstacle in step a) and determines that the obstacle is a motor vehicle in step b), the controller is programmed to apply the resistive force on the vehicle door even if the vehicle door is open by less than the selected amount.

11. A vehicle door control system as claimed in claim 10, wherein the data includes at least one of a position of the obstacle, a speed of the obstacle, a direction of the obstacle and a type of obstacle.

12. A vehicle door control system as claimed in claim 11, wherein the type of obstacle is categorized into at least two categories including at least one category including motor vehicles, and at least one category including obstacles that are not motor vehicles.

13. A vehicle door control system as claimed in claim 10, wherein the controller is programmed to:
e) determine the position of a vehicle occupant, wherein the resistive force applied in step d) is also based on the determination made in step e).

14. A vehicle door control system as claimed in claim 10, wherein, if the controller determines in step b) that the obstacle is a motor vehicle, the resistive force applied by the controller on the vehicle door is sufficient to substantially prevent an occupant from opening the door.

15. A vehicle door control system as claimed in claim 10, wherein the controller is programmed to determine an estimate of the weight and speed of the obstacle and an available travel for the vehicle door based on the position of the door, and is programmed to determine the resistive force to apply to the vehicle door based on the estimate of the weight and speed of the obstacle so as to bring the obstacle to a stop using substantially all of the available travel of the vehicle door.

16. A vehicle door control system as claimed in claim 10, wherein the vehicle includes at least one occupant position detection sensor that communicates with the controller and wherein, in a situation in which the controller determines that a vehicle occupant has a body part outside a door opening for the vehicle door, the controller is programmed to determine a minimum acceptable door open angle and a safe amount of available travel for the vehicle door to inhibit contact of the vehicle door with the vehicle occupant.

17. A vehicle door control system for a vehicle having a vehicle body and a vehicle door, comprising:
a check arm having an end that is mounted to one of the vehicle body and the vehicle door;
a check arm holder at least a portion of which is mounted to the other of the vehicle body and the vehicle door; and
a controller that is programmed to:
a) determine whether an obstacle is approaching the vehicle;
b) determine data relating to the obstacle, including a type of the obstacle, including at least one category including motor vehicles but is free of non-motorized vehicles, and at least one category including obstacles that are not vehicles but is free of motorized vehicles;
c) determine the position of the vehicle door; and
d) apply a resistive force on the vehicle door based on the determinations made in steps a), b) and c).

18. A vehicle door control system as claimed in claim 17, wherein the controller is programmed to determine an estimate of the weight and speed of the obstacle and an available travel for the vehicle door based on the position of the door, and is programmed to determine the resistive force to apply to the vehicle door based on the estimate of the weight and speed of the obstacle so as to bring the obstacle to a stop using substantially all of the available travel of the vehicle door.

19. A vehicle door control system for a vehicle having a vehicle body and a vehicle door, comprising:
a check arm having an end that is mounted to one of the vehicle body and the vehicle door;
a check arm holder at least a portion of which is mounted to the other of the vehicle body and the vehicle door; and
a controller that is programmed to:
a) determine whether an obstacle is approaching the vehicle;
b) determine data relating to the obstacle;
c) determine the position of the vehicle door; and
d) apply a resistive force on the vehicle door based on the determinations made in steps a), b) and c),
wherein the vehicle includes at least one occupant position detection sensor that communicates with the controller and wherein, in a situation in which the controller determines that a vehicle occupant has a body part outside a door opening for the vehicle door, the controller is programmed to determine a minimum acceptable door open angle and a safe amount of available travel for the vehicle door to inhibit contact of the vehicle door with the vehicle occupant.

* * * * *